(12) United States Patent
Morimoto et al.

(10) Patent No.: US 7,262,823 B2
(45) Date of Patent: Aug. 28, 2007

(54) DISPLAY DEVICE AND MANUFACTURING METHOD THEREOF

(75) Inventors: Masateru Morimoto, Mobara (JP); Hirotaka Imayama, Mobara (JP); Ryoji Iwamura, Yokohama (JP); Kazufumi Watabe, Yotsukaido (JP); Hiromu Terao, Chiba (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 0 days.

(21) Appl. No.: 10/860,489

(22) Filed: Jun. 4, 2004

(65) Prior Publication Data

US 2004/0246420 A1   Dec. 9, 2004

(30) Foreign Application Priority Data

Jun. 4, 2003   (JP)   ............................. 2003-159442

(51) Int. Cl.
*G02F 1/1337* (2006.01)

(52) U.S. Cl. ..................................... 349/123
(58) Field of Classification Search ................ 349/153
See application file for complete search history.

(56) References Cited

U.S. PATENT DOCUMENTS

| | | | | |
|---|---|---|---|---|
| 6,645,603 B2* | 11/2003 | Koyama et al. | ............ | 428/167 |
| 6,710,832 B2* | 3/2004 | Hattori et al. | .............. | 349/124 |
| 2001/0048499 A1* | 12/2001 | Numano et al. | ............ | 349/123 |
| 2002/0047980 A1* | 4/2002 | Jun et al. | .................... | 349/158 |

FOREIGN PATENT DOCUMENTS

JP   2001-337316   12/2001

* cited by examiner

*Primary Examiner*—James A. Dudek
(74) *Attorney, Agent, or Firm*—Antonelli, Terry, Stout & Kraus, LLP.

(57) ABSTRACT

A display device includes an organic film with a pattern in which forming portions and non-forming portions are present in a mixed form in the periphery thereof, and the pattern is formed around the periphery of the organic film.

5 Claims, 8 Drawing Sheets

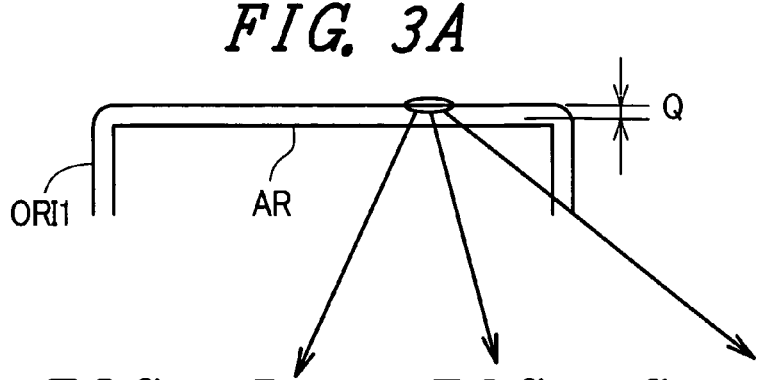
FIG. 3A
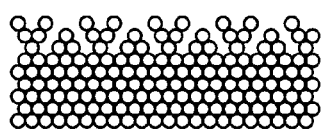
FIG. 3B
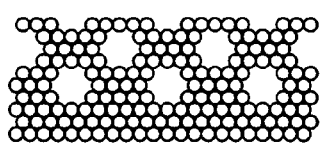
FIG. 3C
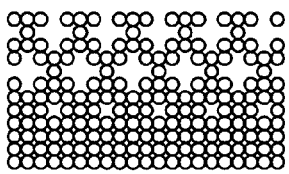
FIG. 3D
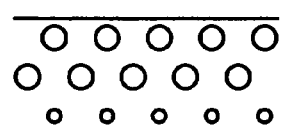
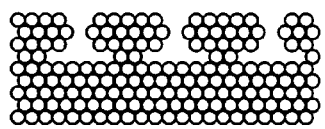
FIG. 3E
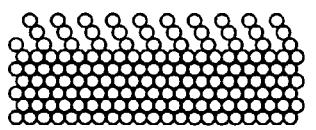
FIG. 3F
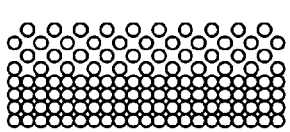
FIG. 3G

FIG. 5
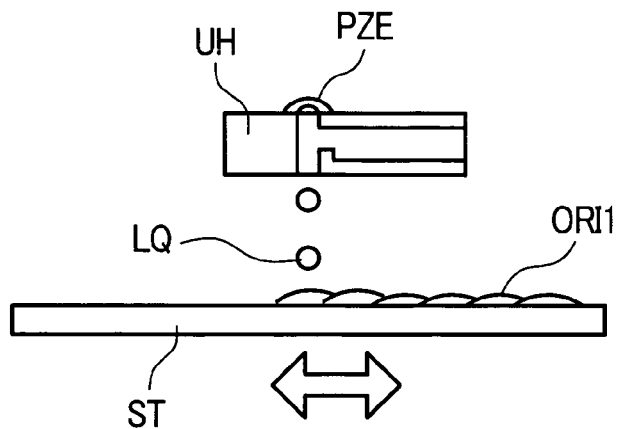
FIG. 6A  FIG. 6B  FIG. 6C
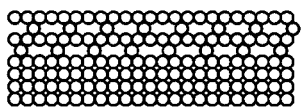 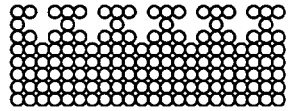 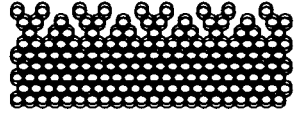
  
FIG. 6D
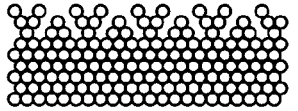
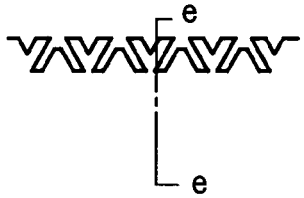
FIG. 6E
FIG. 6F  FIG. 6G  FIG. 6H
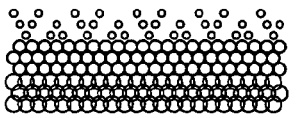 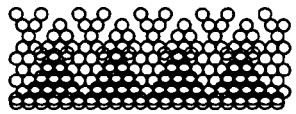 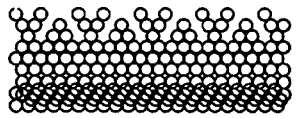

DISPLAY DEVICE AND MANUFACTURING METHOD THEREOF

BACKGROUND OF THE INVENTION

The present invention relates to a display device and, more particularly, the invention relates to improvements in the formation of films, such as an orientation film in an liquid crystal display device.

A liquid crystal display device, for example, is configured such that an envelope is formed by a pair of substrates which are arranged to face each other in an opposed manner with liquid crystal disposed therebetween, and a large number of pixels are formed in the area of the liquid crystal.

A pair of electrodes are formed in each pixel, and the optical transmissivity of the liquid crystal is controlled for each pixel in response to an electric field generated between these electrodes.

Although the optical transmissivity of the liquid crystal is determined in accordance with the modes of behavior of the liquid crystal, depending on the strength of the electric field applied to the liquid crystal, it is necessary to set the initial orientation direction of molecules of the liquid crystal, and this can be performed by orientation films which are formed on respective liquid-crystal-side surfaces of the respective substrates which are brought into contact with the liquid crystal.

The orientation films are formed of, for example, a resin film which covers the whole of a liquid crystal display part, which is constituted of a plurality of pixels, wherein a rubbing treatment, for example, is applied to the liquid-crystal-side surfaces, and the rubbing direction is aligned with the initial orientation direction of the molecules of the liquid crystal which is brought into contact with the orientation films.

Further, with respect to the formation of the resin film, a method which forms the resin film using a so-called ink jet printing method is disclosed in JP-A-2001-337316, for example.

SUMMARY OF THE INVENTION

However, with respect to the orientation films which are formed in this manner, it has been pointed out that size control and shape control of these orientation films at the peripheries thereof has been difficult.

This problem is attributed to a fact that the material which is ejected by the ink jet printing method exhibits a low solid concentration and a low viscosity. Here, while the viscosity of the material which is used in a so-called flexography printing method is 25 mPa·s or more, the viscosity of the material used in the ink jet printing method is 12 mPa·s or less. Accordingly, to make the thickness of a resin film formed by the ink jet printing method substantially equal to the thickness of the resin film formed by the flexography printing method, it is necessary to apply an amount of solvent which is twice as large as the amount of solvent used in the flexography printing method to a substrate. However, since the solvent exhibits a low viscosity and the amount of solvent is large, the solvent spreads by wetting to the periphery of the substrate by approximately 1 to 2 mm or more with respect to the position to be coated, for example.

Further, the chances that this spreading of the solvent by wetting will become uniform over the whole region of the periphery of the resin film are small, and, hence, the formation of spatially wasteful regions is unavoidable.

On the other hand, since drying of the resin film is performed after applying the resin film, the viscosity of the solution of the resin film is increased by this drying, and, hence, it can be expected that the spreading by wetting in the periphery of the resin film can be suppressed. However, since the resin film has to be formed with a given thickness, the drying speed is also restricted.

The present invention is based on such circumstances, and it is an object of the present invention to provide a liquid crystal display device having orientation films in which spreading by wetting in the periphery of a substrate can be obviated.

A summary of typical Examples of the invention disclosed in this specification is as follows.

(1)

The display device according to the present invention, for example, includes an orientation film on a liquid-crystal-side surface of at least one substrate out of respective substrates which are arranged to face each other with liquid crystal disposed therebetween, wherein the orientation film includes a pattern in which forming portions and non-forming portions are present in a mixed form in the periphery thereof, and the pattern is formed along the periphery of the orientation film.

(2)

The display device according to the present invention, for example, includes an orientation film on a liquid-crystal-side surface of at least one substrate of respective substrates which are arranged to face each other with liquid crystal disposed therebetween, wherein the orientation film forms a pattern which is constituted of either notches or holes on the periphery thereof and the pattern is formed along the periphery of the orientation film.

(3)

The display device according to the present invention is, for example, on the premise of the constitution of Example (1), characterized in that the periphery of the orientation film has a thickness smaller than the thickness of the display region of the display device.

(4)

The display device according to the present invention is, for example, on the premise of the constitution of Example (2), characterized in that the periphery of the orientation film has a thickness smaller than the thickness of the display region of the display device.

(5)

The display device according to the present invention is, for example, on the premise of the constitution of Example (1), characterized in that the display device includes a sealing material which fixes the respective substrates to each other, and the periphery of the orientation film is formed such that the periphery of the orientation film extends to a region where the sealing material is formed.

(6)

The display device according to the present invention is, for example, on the premise of the constitution of Example (5), characterized in that, in an area where the sealing material is formed, the area of those portions where the orientation film is not formed is larger than the area of the portions where the orientation film is formed.

(7)

The display device according to the present invention, for example, includes an orientation film on a liquid-crystal-side surface of at least one substrate of respective substrates which are arranged to face each other with liquid crystal disposed therebetween, wherein an end portion of the orientation film is positioned in the inside of a groove formed in a material layer which is formed below the orientation film.

(8)

The display device according to the present invention, for example, includes an orientation film on a liquid-crystal-side surface of at least one substrate of respective substrates which are arranged to face each other with liquid crystal disposed therebetween, wherein the display device includes columnar spacers which are formed on either one of the respective substrates, and a peripheral end of the orientation film is positioned to be in contact with spacers which are arranged to surround the orientation film.

(9)

The display device according to the present invention, for example, includes an organic film, wherein the organic film includes a pattern in which forming portions and non-forming portions are present in a mixed form at the periphery thereof, and the pattern is formed along the periphery of the organic film.

(10)

The display device according to the present invention, for example, includes an organic film, wherein the organic film forms a pattern which is constituted of either notches or holes at the periphery thereof, and the pattern is formed along the periphery of the organic film.

(11)

The display device according to the present invention is, for example, on the premise of the constitution of Example (9), characterized in that the periphery of the organic film has a thickness smaller than the thickness of the display region of the display device.

(12)

The display device according to the present invention is, for example, on the premise of the constitution of Example (10), characterized in that the periphery of the organic film has a thickness smaller than the thickness of the display region of the display device.

(13)

The method of manufacture of a display device according to the present invention, for example, includes a step of forming a bank which fringes a profile of an orientation film using the same material as the orientation film, a step of forming the orientation film in a region surrounded by the bank with a gap defined between the bank and the orientation film, and a step of bringing the bank and the orientation film into contact with each other by leveling.

(14)

The manufacturing method according to the present invention is, for example, on the premise of the constitution of Example (13), characterized in that the periphery of the orientation film has a film thickness smaller than the thickness of the display region of the display device.

(15)

The manufacturing method according to the present invention, for example, is employed for the manufacture of a liquid crystal display device which is provided with an orientation film on a liquid-crystal-side surface of at least one substrate out of respective substrates which are arranged to face each other with liquid crystal disposed therebetween, wherein the method includes a step of forming a large number of minute drops of an orientation film on the substrate by an ink jet method in a state such that the minute drops are formed in a pattern in which dropped portions and non-dropped portions are present in a mixed form at a peripheral portion of the orientation film, and a step of heating the orientation film.

(16)

The manufacturing method according to the present invention, for example, is employed for the manufacture of a display device which is provided with an organic film, wherein the method includes a step of forming a large number of minute drops of an organic film on a substrate by an ink jet method in a state such that the minute drops are formed in a pattern in which dropped portions and non-dropped portions are present in a mixed form at a peripheral portion of the organic film, and a step of heating the organic film.

The present invention is not limited to the above-mentioned Examples and various modifications can be made without departing from the technical concept of the present invention.

BRIEF DESCRIPTION OF THE DRAWINGS

FIGS. 3A to 3G are diagrams showing orientation film patterns in one embodiment of a display device according to the present invention;

FIG. 5 is a diagrammatic cross-sectional view showing the constitution of a piezoelectric element provided to an ink jet head of the device shown in FIG. 4A;

FIGS. 6A to 6D and 6F to 6H are diagrams showing other examples of an orientation film in another embodiment of the display device according to the present invention, and FIG. 6E is a cross-sectional view taken along line e-e in FIG. 6D;

DESCRIPTION OF THE PREFERRED EMBODIMENTS

Preferred embodiments of a liquid crystal display device according to the present invention will be explained in conjunction with the drawings.

Embodiment 1

Figure 1:
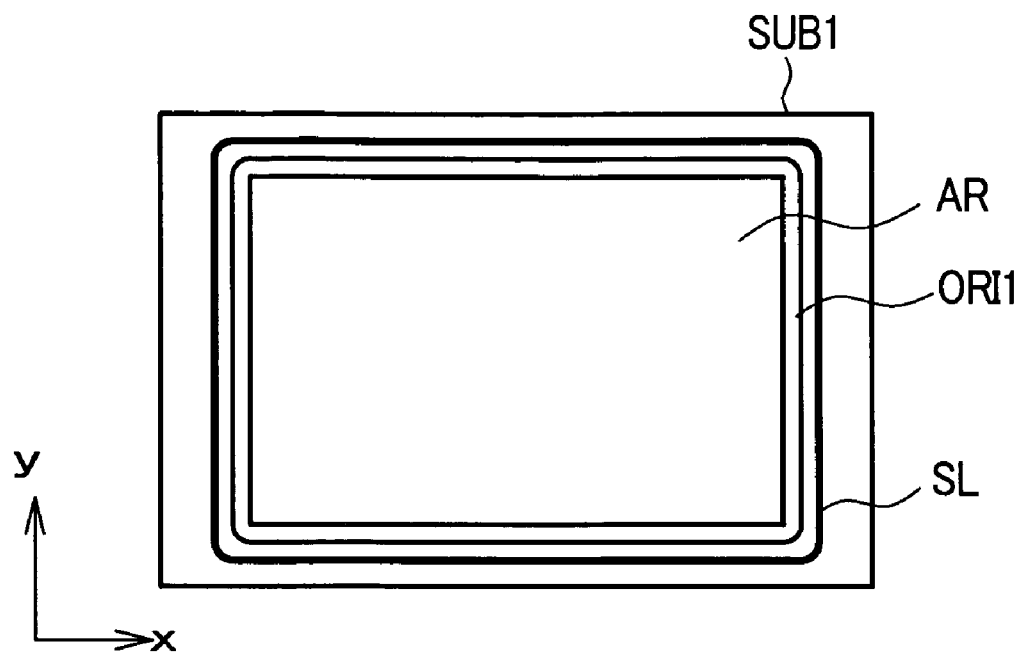
FIG. 1 is a plan view showing one embodiment of a display device according to the present invention.

FIG. 1 is a plan view showing a liquid-crystal-side surface of one of the respective substrates which constitute the display panel. Here, a liquid-crystal-side surface of other substrate also has substantially the same structure.

On the liquid-crystal-side surface of the substrate SUB1, a sealing material SL is formed in a state such that a peripheral region of the substrate slightly remains, and the sealing material SL surrounds a center portion region. The sealing material SL has a function of fixing the other substrate SUB2 (not shown in the drawing) to the substrate SUB1, and, at the same time, it has a function of sealing the liquid crystal interposed between the respective substrates.

The region surrounded by the sealing material SL constitutes a region where a liquid crystal display part AR is formed, while slightly leaving a peripheral portion thereof.

Figure 2:
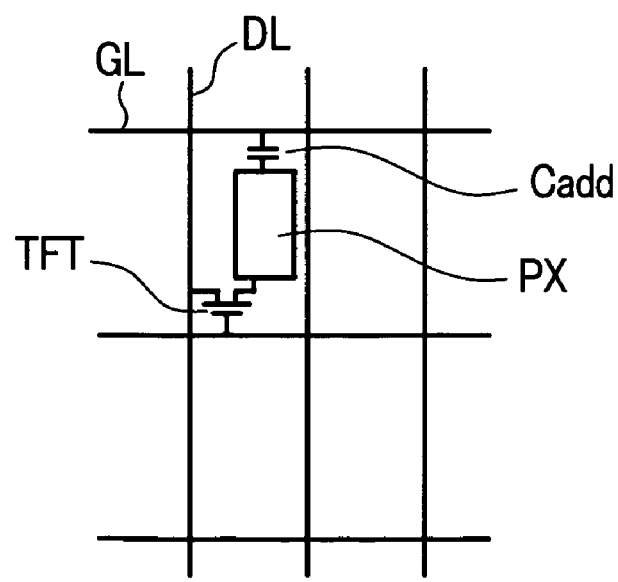
FIG. 2 is an equivalent circuit diagram showing one embodiment of the display device according to the present invention.

In the liquid crystal display part AR, as shown in FIG. 2, for example, respective regions which are surrounded by gate signal lines GL, which extend in the x direction and are arranged in parallel in the y direction, and drain signal lines DL, which extend in the y direction and are arranged in parallel in the x direction, constitute pixel regions. On the pixel region, there are a thin film transistor TFT, which is driven in response to a scanning signal from the one-side gate signal line GL, a pixel electrode PX, to which a video signal is supplied from the one-side drain signal line DL through the thin film transistor TFT, and a capacitive element Cadd, which is formed between the gate signal line GL, for driving the pixel electrode PX and the thin film transistor TFT, and another neighboring gate signal line GL. Here, although the pixel electrode PX is configured to generate an electric field for controlling the optical transmissivity of the liquid crystal between a counter electrode (not shown in the drawing) and the pixel electrode PX, the counter electrode may be formed on either one of the surface of the substrate SUB1 side and the surface of the substrate SUB2 side.

Further, each gate signal line GL has one end thereof, for example, extended to the periphery of the substrate SUB1 beyond the sealing material SL, and a scanning signal is supplied from a scanning signal drive circuit (not shown in the drawing) through the extended end of the gate signal line GL. In the same manner, each drain signal line DL has one end thereof, for example, extended to the periphery of the substrate SUB1 beyond the sealing material SL, and a video signal is supplied from a video signal drive circuit (not shown in the drawing) through the extended end of the drain signal line DL.

An orientation film ORI1 is formed such that the orientation film ORI1 covers the liquid crystal display part AR having such a constitution. The orientation film ORI1 is a film made of resin, for example, which directly comes into contact with the liquid crystal. The initial orientation direction of the liquid crystal is determined by rubbing applied to a surface of the orientation film ORI1, for example.

The orientation film ORI1 is formed such that the whole area of the periphery of the orientation film ORI1 projects from the liquid crystal display part AR by approximately 1.0 mm, and the position of the outer profile is set such that the orientation film ORI1 is not brought into contact with the sealing material SL. This is because, when the orientation film ORI1 extends to the region where the sealing material SL is formed, the adhesive strength of the sealing material SL is weakened.

FIGS. 3A to 3G show a state immediately after the orientation film is deposited by an ink jet method and a resulting state in which the liquid droplets of the orientation film are melted to each other and are solidified. In respective views shown in FIGS. 3B to 3G, the upper portions show the state immediately after the orientation film has been deposited and the lower portions show the state after the liquid droplets are melted and solidified by heating in the same region.

As shown in FIG. 3A, the orientation film ORI1 includes a region which has a given width (for example, approximately 1.0 mm) extending outwardly from an outer profile of the liquid crystal display part AR. In this region, as shown in FIG. 3B, notched portions are formed in a periphery of the region, wherein the notched portions are formed along the periphery at a substantially equal interval, for example. The notched portions are formed in a portion which is indicated by Q in the drawing out of the given width (approximately 1.0 mm) extending outwardly from the outer profile of the liquid crystal display part AR. Further, as another example, as shown in FIG. 3C, hole portions are formed in the periphery and these hole portions are formed along the periphery at a substantially equal interval. Further, as another example, as shown in FIG. 3D, notched portions and hole portions are formed in the periphery, and these notched portions and hole portions are formed along the periphery at a substantially equal interval. Further, as other examples, FIG. 3E shows a pattern in which respective notched portions have a particular shape (T shape); FIG. 3F shows a pattern in which respective notched portions are inclined in one direction; and FIG. 3G shows a pattern in which notched portions and hole portions are formed and the diameter of the hole portions is set relatively small, thus exhibiting a dense structure.

Here, in FIG. 3B to FIG. 3G, lower views which are substantially equal to the upper views are depicted. These lower views are provided as simplified views for facilitating an understanding of the resulting shapes of the periphery of the orientation film ORI1.

As can be understood from the respective views shown in FIGS. 3B to 3G, the periphery of the orientation film ORI1 has minute portions where film is not formed. In other words, the orientation film has a pattern in which forming portions and non-forming portions are present in a mixed form in the periphery thereof. The pattern is formed along the periphery of the orientation film. Further, by controlling the quantity of the orientation film material dropped by the ink jet method for every position, it is possible to make the pattern substantially uniform along the periphery.

With respect to the orientation film ORI1 having such a constitution, at the time of applying resin and thereafter drying the resin for manufacturing the orientation film ORI1, the drying speed is accelerated, and, hence, the viscosity is elevated, whereby the spreading by wetting can be obviated. In the periphery of the orientation film ORI1, since the quantity of resin is small and the length of the periphery is elongated, the drying can be performed with an increased drying speed compared to the other regions.

Figure 4A:
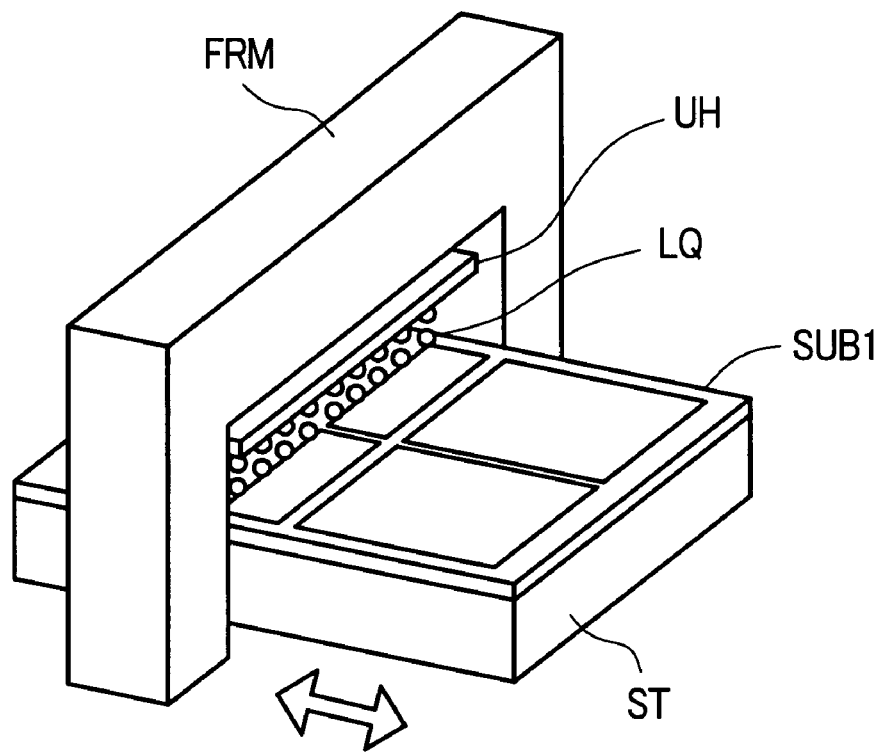
FIG. 4A is a constitutional view showing a device used in the manufacture of the display device according to the present invention.
Figure 4B:
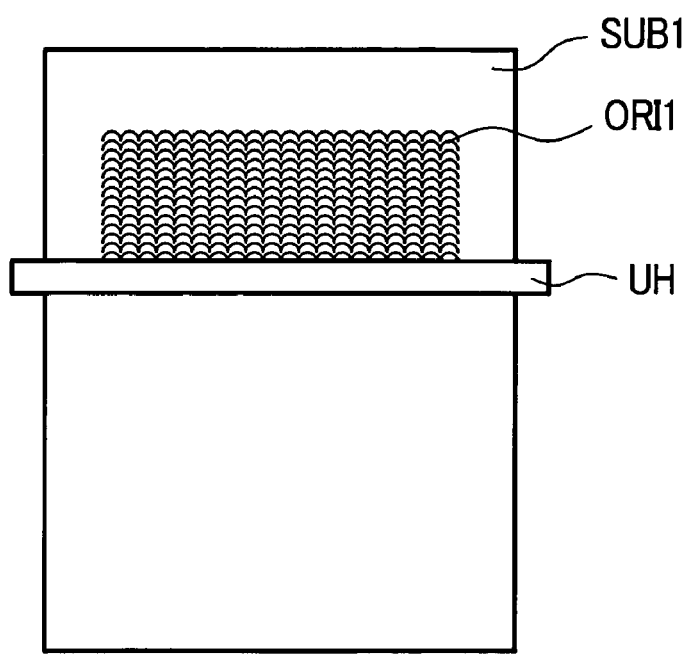
FIG. 4B is a top plan view showing the forming of the orientation film.

FIG. 4A and FIG. 4B are views showing a device for forming the orientation film ORI1 having the above-mentioned pattern on the substrate SUB1, wherein FIG. 4A is a perspective view of the device.

In FIG. 4A, the device includes a stage ST on which the substrate SUB1 is mounted, and this stage ST is configured to be moved through the inside of a frame body-FRM which has an ink jet head IJH mounted on an upper portion thereof. Here, the substrates SUB1 constitute a set from which four substrates SUB1 can be obtained by dividing the set by cutting, as shown in the drawing, for example.

The ink jet head IJH, as shown in FIG. 5, includes piezoelectric elements PZE, and it is capable of ejecting the orientation film liquid LQ supplied to the piezoelectric elements PZE to the above-mentioned substrate SUB1 by making use of pressure generated by driving the piezoelectric elements PZE. A large number of piezoelectric elements PZE are arranged in parallel in the direction orthogonal to the moving direction of the substrate SUB1 (stage ST). Due to such a constitution, as shown in FIG. 4B, which is a top plan view of the device shown in FIG. 4A, the resin film which is formed linearly on the substrate SUB1 by the ink jet head IJH is, along with the movement of the substrate SUB1, sequentially moved in the vertical direction whereby a resin film having a planar shape, that is, the orientation film ORI1, can be formed.

Here, in the ink jet head IJH in which a large number of piezoelectric elements PZE are arranged in parallel in the direction orthogonal to the moving direction of the substrate SUB1 (stage ST), first of all, in the initial stage, the respective piezoelectric elements PZE are driven so as to have an ink ejecting state and an ink stop state for every two or three elements, for example. In the next stage, while the respective piezoelectric elements PZE are in a state such that ink is always ejected, except for the piezoelectric elements PZE at both ends and in the vicinities of both ends, the piezoelectric elements PZE at both ends and in the vicinities of both ends are driven to repeat the ejection of ink and stop the ejection of ink. Then, in the final stage, the respective piezoelectric elements PZE are driven for every few elements to repeat the ejection and the stopping of ejection of ink, for example. By driving the ink jet head IJH, the periphery of the formed orientation/film ORI1 has minute portions where the film is not formed and these minute portions are formed in a pattern which is substantially uniform along the periphery.

Embodiment 2

Respective views constituting FIGS. 6A to 6H show a state immediately after the orientation film is deposited by an ink jet method and a state in which liquid droplets of the orientation film are melted to each other and are solidified. In respective views, the upper portions show the state immediately after dropping the orientation film and the lower portions show the state after the liquid droplets of the orientation film are melted and solidified by heating in the same region.

FIG. 6A to FIG. 6H are, in the above-mentioned orientation film ORI1, views showing other embodiments of the pattern of the periphery and correspond to respective views shown in FIG. 3B to FIG. 3G.

FIG. 6A shows a pattern in which a plurality of hole portions are formed along the periphery, and the hole portions have a rectangular shape; FIG. 6B shows a pattern in which the notched portions are formed along the periphery, and the notched portions have a particular shape (cruciform); FIG. 6C shows a pattern in which the notches are formed along the periphery, although a slight displacement is generated between the orientation film ORI1 on the first layer and the orientation film ORI2 on the second layer in the notched portions; and FIG. 6D shows a pattern in which notches are formed in the periphery, and the periphery has a film thickness that is smaller than the film thickness of the other region. FIG. 6E is a cross-sectional view taken along a line e-e in FIG. 6D. Further, FIG. 6F shows a pattern in which notched portions are formed by adjusting the discharge quantity of the orientation film solution to a small value in the periphery; FIG. 6G shows a pattern in which notched portions are formed in the periphery of the first-layer orientation film ORI1, and the second-layer orientation film ORI2 is formed while obviating the periphery of the first-layer orientation film ORI1; and Fig. H shows a pattern which has substantially the same constitution as the constitution shown in FIG. 6G, but the notched portions are formed by adjusting the discharge pitch of the ink jet head IJH.

By adopting any one of these patterns, it is possible to obtain substantially the same advantageous effect.

Embodiment 3

Figure 7A:
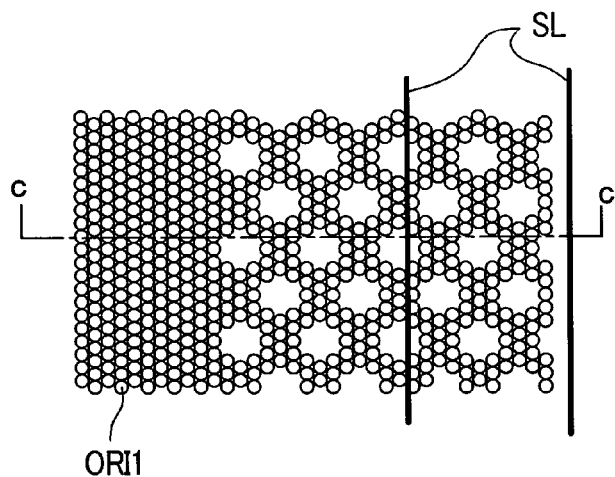
FIGS. 7A and 7B are diagrams showing the positional relationship between an orientation film and a sealing material of the display device according to the present invention.
Figure 7B:
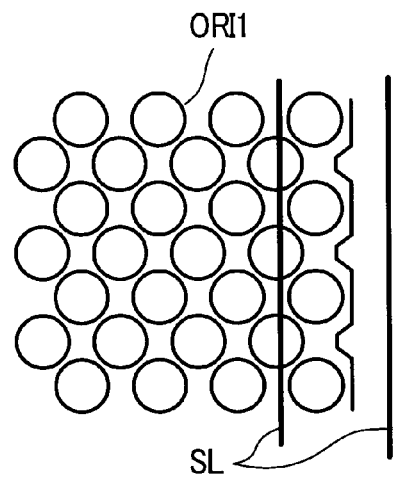

FIG. 7A is a plan view showing another embodiment of the liquid crystal display device according to the present invention, and it is also a view which shows the arrangement relationship between an orientation film ORI1 which forms hole portions or the like in a periphery thereof and a sealing material SL. FIG. 7B is a view showing the shape of the periphery of the orientation film ORI1 shown in FIG. 7A in a simplified form to facilitate an understanding of the shape.

By forming hole portions or the like, for example, in the periphery of the orientation film ORI1, a pattern is formed in which minute portions, where the film is not formed, are provided, and the minute portions are substantially uniformly formed along the periphery, and the peripheral portion is made to extend to a region where the sealing material SL is formed. In other words, the periphery of the orientation film ORI1 constitutes a region where the sealing material SL is formed.

This is because, in the region where the sealing material SL is formed, although a portion of the sealing material SL is brought into contact with the orientation film ORI1, another remaining portion is configured to be brought into contact with an inorganic material layer which is disposed below the orientation film ORI1, and, hence, it is possible to sufficiently ensure the adhesive strength of the sealing material SL. Accordingly, with respect to the fixing portion of the sealing material SL, it is effective to set the area of the hole portions of the orientation film ORI1 to be larger than the area of portions which are brought into contact with the orientation film ORI1.

Figure 7C:
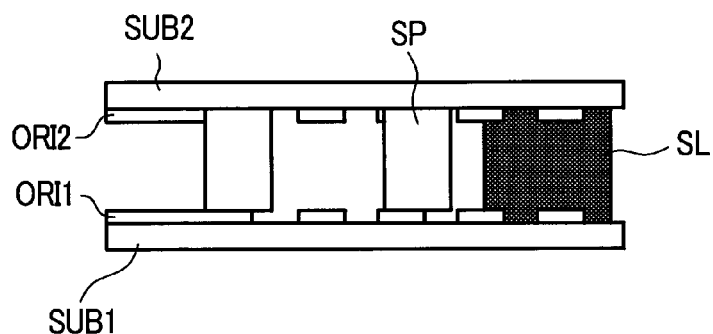
FIG. 7C is a cross-sectional view taken along line c-c in FIG. 7A.

FIG. 7C is a cross-sectional view taken along a line c-c in FIG. 7A. From this drawing, it can be understood that the sealing material SL is adhered to the substrates SUB1, SUB2 at portions which are not covered with the orientation films ORI1, ORI2.

In FIG. 7C, symbol SP indicates spacers which are used for establishing a uniform gap between substrates SUB1, SUB2, and they are arranged in the inside of a liquid crystal display part AR in a scattered manner. Further, the spacers SP are constituted of columnar spacers which may be formed at the substrate SUB2 side, for example.

Embodiment 4

Figure 8:
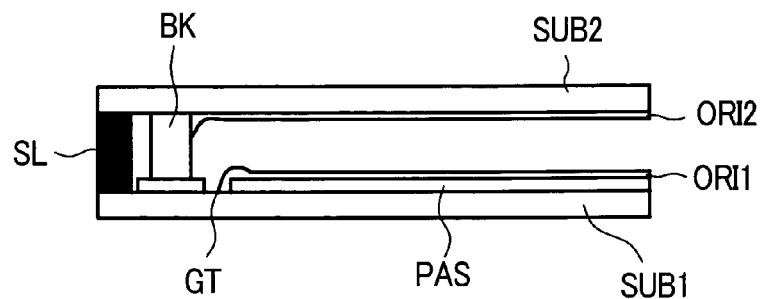
FIG. 8 is a cross-sectional view showing another embodiment of the display device according to the present invention.

FIG. 8 is a sectional view showing another embodiment of the liquid crystal display device according to the present invention similar to FIG. 7C. The orientation film ORI1 used in this embodiment has neither hole portions nor notched portions in the periphery thereof and is substantially equal to an orientation film which is formed in a usual so-called printing step.

However, with respect to the orientation film ORI1, an organic insulation film PAS is formed on a surface of the substrate SUB1 on which the orientation film ORI1 is formed, and a groove GT is formed in the peripheral portion of the orientation film ORI1 along the orientation film ORI1. In other words, the peripheral portion of the orientation film ORI1 is formed so as to be positioned in the inside of the groove GT, which is formed in the organic insulation film PAS.

By forming the resin film (orientation film ORI1) in the above-mentioned pattern by printing, it is possible to suppress the spreading by wetting of the periphery of the resin film by provision of the groove GT.

In FIG. 8, symbol BK indicates a bank for sealing liquid crystal, which bank BK is formed at the substrate SUB2 side and is formed in a pattern in which the bank BK sufficiently surrounds the liquid crystal display part AR. That is, by placing the substrate SUB2 on which the bank BK is formed such that the bank BK is arranged above the substrate SUB2, the liquid crystal can be sufficiently dropped onto the region which is surrounded by the bank BK, after which the substrate SUB1 is arranged to face the substrate SUB2, and the fixing of the substrate SUB1 to the substrate SUB2 is performed by the sealing material SL.

In this case, the orientation film ORI2 which is formed on the liquid-crystal-side surface of the substrate SUB2 is formed after forming the bank BK, and, hence, although the periphery of the orientation film ORI2 is formed along the inner side surface of the bank BK, the adhesive strength with the bank BK can be ensured; and, at the same time, since the portion is positioned relatively remote from the liquid crystal display part AR, there arises no drawback in arranging the periphery of the orientation film ORI2 along the inner side surface of the bank BK.

Embodiment 5

Figure 9A:
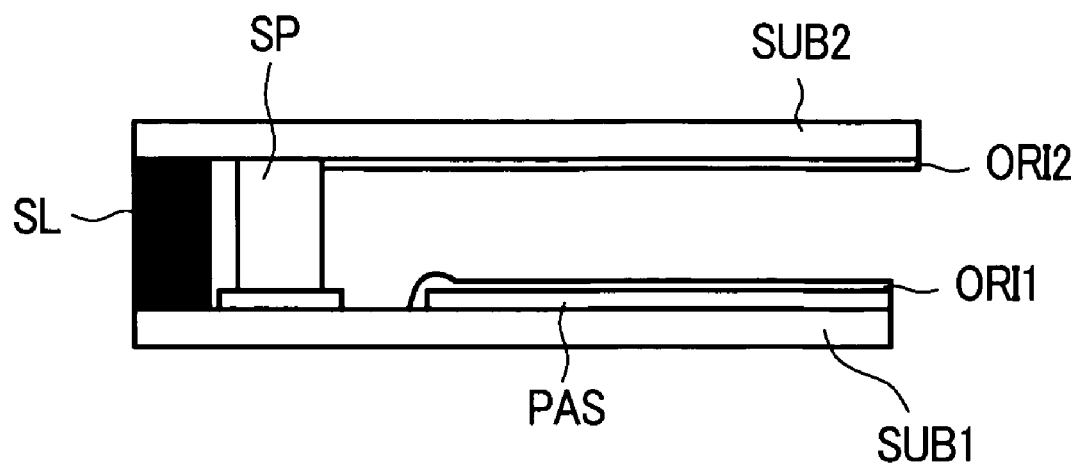
FIGS. 9A and 9B are diagrams showing another embodiment of the display device according to the present invention.

FIG. 9A is a plan view showing another embodiment of the liquid crystal display device according to the present invention, and it is similar to FIG. 8.

The constitution which makes this embodiment different from the embodiment shown in FIG. 8 lies in the fact that spacers SP are used in place of the banks BK for sealing the liquid crystal formed in FIG. 8, and a plurality of spacers SP are arranged in parallel along the periphery of the orientation film ORI2.

Figure 9B:
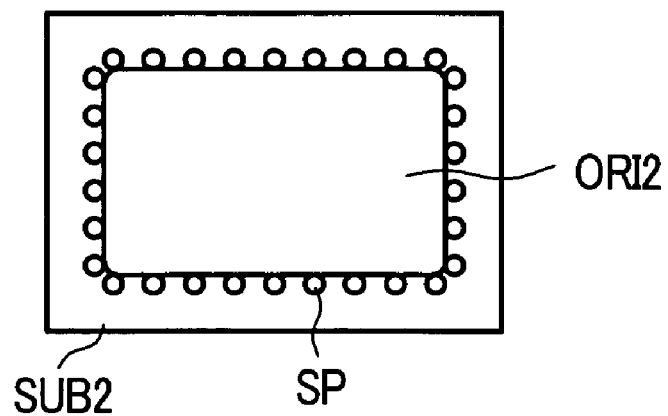

The respective spacers SP constitute columnar supports which are formed on the substrate SUB2 side before forming the orientation film ORI2. As shown in the plan view in FIG. 9B, the orientation film ORI2, which is formed thereafter, can prevent the spreading by wetting using the surface tension which acts between the respective spacers SP in the periphery thereof as resistance.

In this case, in the same manner as the embodiment shown in FIG. 8, the orientation film ORI2 is substantially equal to an orientation film which is formed by a usual printing method.

Embodiment 6

Figure 10A:
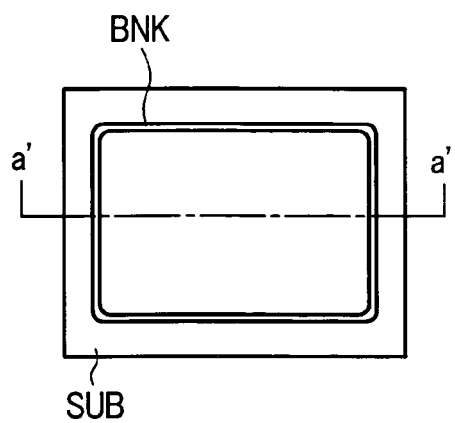
FIGS. 10A to 10C are diagrammatic plan views and FIGS. 10A' to 10C' are cross-sectional views taken along line a'-a', b'-b' and c'-c' in FIGS. 10A to 10C, respectively, showing steps method of manufacture of a display device according to the present invention.
Figure 10A:
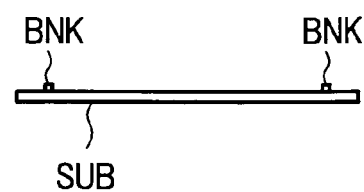
Figure 10B:
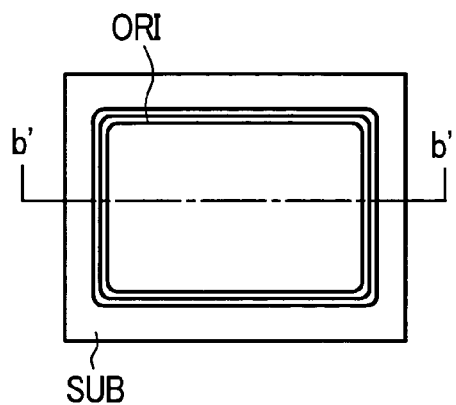
Figure 10B:
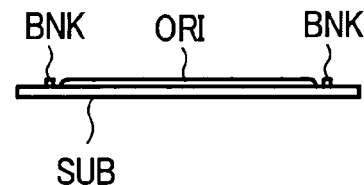
Figure 10C:
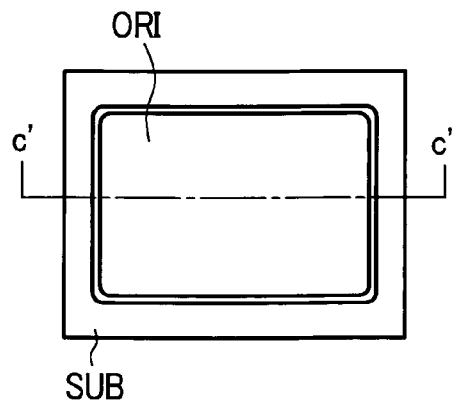
Figure 10C:
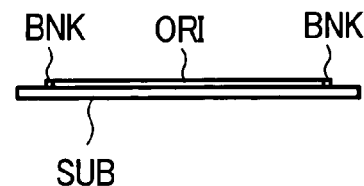

FIG. 10A to FIG. 10C are views showing steps of a method of manufacturing an orientation film of a liquid crystal display device according to the present invention.

Here, FIG. 10A' is a cross-sectional view taken along a line a'-a' in FIG. 10A, FIG. 10B' is a cross-sectional view taken along a line b'-b' in FIG. 10B, and FIG. 10C' is a cross-sectional view taken along a line c'-c' in FIG. 10C.

First of all, the substrate SUB on which the orientation film ORI is formed is prepared and the bank BNK is formed in a pattern which fringes the region where the orientation film ORI is formed. This bank BNK is made of the same material as the material of the orientation film ORI which will be formed hereinafter, and it is formed by ink jet printing, for example.

Then, the orientation film ORI is formed in the inside of the region which is surrounded by the bank BNK by ink jet printing, for example. In this case, a slight gap is formed between the periphery of the orientation film ORI and the bank BNK, and, at the same time, the film thickness of the periphery is set to be smaller than the film thickness of the other portions.

The reduction of the film thickness of the periphery of the orientation film ORI can be easily obtained by controlling the ink ejection and the stopping of ink ejection using respective piezoelectric elements PZE of the ink jet head IJH in the device shown in FIG. 4A.

Further, by leveling the orientation film ORI, the orientation film ORI is integrally formed with the bank BNK, and, hence, the periphery of the orientation film ORI is accurately formed at predetermined positions due to the bank BNK, which becomes a portion of the orientation film ORI.

Figure 11A:
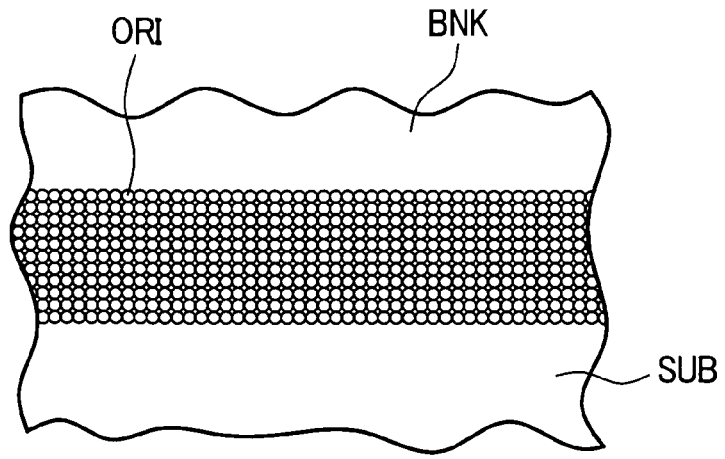
FIGS. 11A to 11C are diagrammatic plan views showing examples of bank patterns.
Figure 11B:
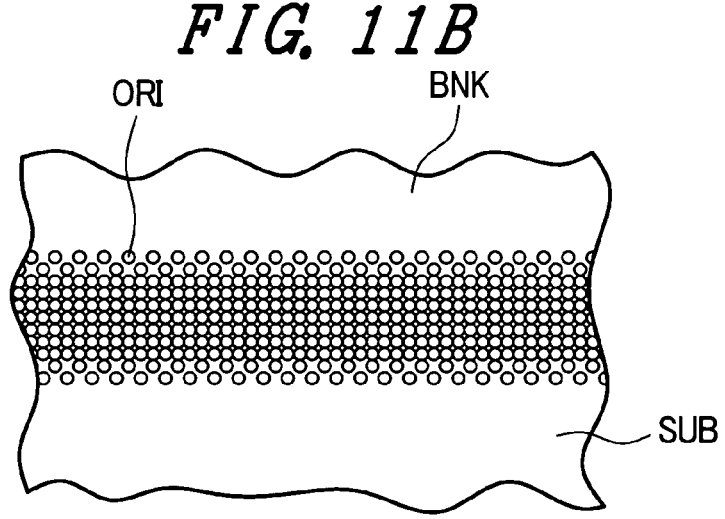
Figure 11C:
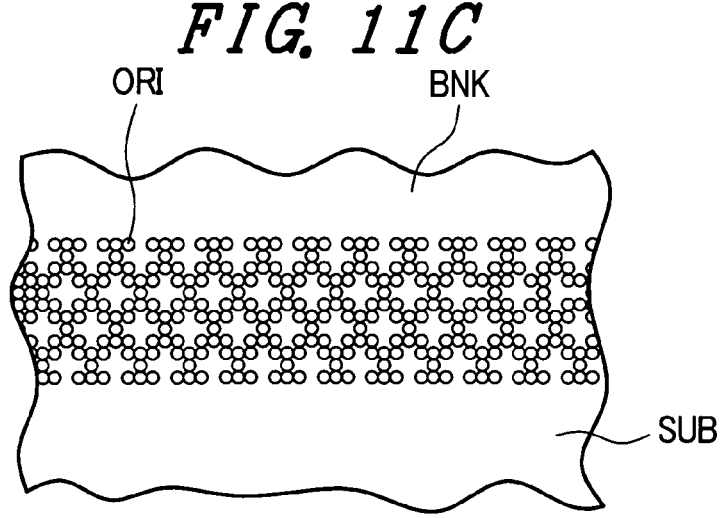

FIG. 11A to FIG. 11C are plan views showing the details of patterns of the bank BNK, wherein FIG. 11A shows a pattern in which neither notched portions nor hole portions are formed in the periphery, FIG. 11B shows a pattern in which notched portions are formed along the periphery, and FIG. 11C shows a pattern in which hole portions are formed over the whole area. In both of the patterns shown in FIG. 11B and FIG. 11C, the drying speed is increased and the spreading by wetting can be obviated by elevation of the viscosity.

Although the above-mentioned respective embodiments have been explained with respect to the orientation film ORI1 formed on the transparent substrate SUB1 side, it is needless to say that these embodiments are applicable to the orientation film ORI2 formed on the transparent substrate SUB2 side in the same manner.

The above-mentioned respective embodiments may be used in a single form or in combination. This is because the advantageous effects of the respective embodiments can be obtained in a single form or synergistically.

Further, the technical concept, the patterns and the manufacturing method disclosed in accordance with the present invention are applicable to the formation of various thin films of a display device besides the orientation film. Particularly, the technical concept, the patterns and the manufacturing method are preferably used for obtaining a uniform film thickness, especially for an organic film. For example, the technical concept, the patterns and the manufacturing method may be applicable to the formation of an organic film, i.e. a protective film of an organic EL display device, which constitutes an example of a display device other than a liquid crystal display device. In addition, it is possible to use the features of the invention for a color filter, overcoat film, and luminescence layer of an organic EL display device.

As can be clearly understood from the foregoing explanation, according to the present invention, it is possible to provide a display device with an orientation film having no spreading by wetting in the periphery, for example. Further, it is possible to realize a thin film in which the uniformity of the film thickness in the periphery and the film thickness of the display region, for example, are enhanced.

What is claimed is:

1. A display device including a liquid crystal and an orientation film which contacts the liquid crystal, wherein the orientation film forms a pattern which is constituted of either a plurality of notches or holes which are spaced from one another on an edge of the orientation film, and the pattern is formed along the edge of the orientation film, the orientation film being substantially rectangular in plan view of the display device.

2. A display device according to claim 1, wherein the edge of the orientation film has a thickness smaller than a film thickness of a display region of the display device formed at least by the liquid crystal.

3. A display device according to claim 1, wherein the pattern of the orientation film is formed only along the edge of the orientation film of the display device.

4. A display device according to claim 1, wherein the display device includes a sealing material which substantially surrounds and is spaced from a periphery of a display region and which fixes respective substrates, and the edge of the orientation film extends beyond the periphery of the display region without contacting the sealing material.

5. A display device according to claim 1, wherein the orientation film enables an initial orientation of the liquid crystal of the display device.

* * * * *